United States Patent [11] 3,569,987

[72] Inventor Jutaro Yonemochi
  Koadachi 171, Komaemachi, Kitatamagun Tokyo, Japan
[21] Appl. No. 795,816
[22] Filed Feb. 3, 1969
[45] Patented Mar. 9, 1971
[32] Priority Feb. 3, 1968
[33] Japan
[31] 43/6564

[54] METHOD OF SMELTING ORES IN A RESISTANCE FURNACE
3 Claims, 3 Drawing Figs.
[52] U.S. Cl. .................................................. 13/34, 75/10, 164/56
[51] Int. Cl. ..................................................... H05b 3/60
[50] Field of Search........................................... 75/10, 11; 164/56 (X), 56; 13/20, 34

[56] References Cited
UNITED STATES PATENTS
3,234,608 2/1966 Peras............................ 164/56(X)
2,370,467 2/1945 Hopkins........................ 75/10(X)
3,167,420 1/1965 Robiette....................... 75/11

Primary Examiner—Bernard A. Gilheany
Assistant Examiner—Roy N. Envall, Jr.
Attorney—Fidelman, Wolffe & Leitner ABSTRACT: A method is provided for the operation of a reduction furnace for smelting reactions whereby reactor capacity, electrode size, and power requirements remain in matched relationship among themselves and with the course of the reaction which is operated in a continuous fashion if the reaction is conducted so that at the time metal and/or slag is tapped, only a relatively minor proportion of the total amount present is removed, and the reaction is conducted under substantially steady-state conditions.

PATENTED MAR 9 1971  3,569,987

METHOD OF SMELTING ORES IN A RESISTANCE FURNACE

This invention relates to a method of operating continuous smelting reactions in a resistance furnace whereby steady-state conditions are maintained.

In the past many techniques have been suggested and utilized to determine the appropriate size, configuration, and arrangement of accessories in reduction furnaces designed for smelting operations. It has been proposed to utilize pulverized coal, supported on the surface of the flag layer, as the reducing agent in such reactions. These operations generally propose that the furnace electrodes extend into the coke reducing agent. The foregoing considerations establish the power requirements of the system, which in turn determines the size of the electrodes. Such furnaces are required to be circular in shape.

The variables established by the prior art techniques are not always suitable for alterations which occur in the system during operation, particularly when continuous operation is effected. For example, when the furnace is tapped, substantially all the molten metal present in the furnace is withdrawn and the volume of the molten material and the levels of various components of the system are varied considerably. As a consequence, the conditions for which the process variables were established no longer obtain and the effectiveness of the system is greatly impaired. The normative values of power density and power per unit area are particularly altered and the efficiency of the system is drastically reduced.

In general such smelting operations are contact reactions between the molten raw material and the reducing agent. It is desirable, and is accordingly an object of the present invention to provide a smelting operation wherein the power requirements, the reactor capacity and proportions, and the size of the electrodes can all be established at effective interrelated levels which maintain near optimum effectiveness throughout the course of smelting operations.

In the present invention, the foregoing objects, and others to become apparent from the following disclosure, are achieved by operation at substantially steady-state or equilibrium conditions. In the method of the present invention, the molten metal removed during the tapping operation comprises a minor increment of the total amount of molten material, i.e. the metal and slag, present in the furnace so that the equilibrium of the system is not substantially altered.

Operation of the furnace in accordance with the foregoing description in which a substantial increment of molten material is retained in the furnace throughout the course of the reaction has the concurrent result that the operating variables established by the prior art techniques are no longer applicable. Since the volume of molten metal in the furnace is retained at substantially greater levels, not only is the capacity of the furnace altered, but in order to avoid erosion of the furnace wall, the distance of the electrodes from the walls and from the level of the metal must be interrelated. The depth of the furnace must be established so that a proper relationship is maintained between the lower ends of the electrodes and the furnace bottom. In general, the techniques of the prior art do not involve these considerations, or the effect of operation in accordance with the present invention on other conditions and variables of operation.

The variables of the operation and the operating conditions are determined by the nature of the chemical reactions in the furnace. The main reaction in smelting operations is the direct reduction of the ore which takes place at the interface between the molten material and the reducing material, usually coke, and molten particles of metal are formed which settle to provide a layer of molten metal product at the bottom of the furnace.

The carbonaceous reducing agent is converted into carbon dioxide gas which flows upwardly through the upper layers in the furnace. As the carbon monoxide passes upwardly, it imparts its heat to the upper layers of material and also provides a secondary or preliminary reducing action, whereby the carbon monoxide is converted to carbon dioxide. The heat transfer and the secondary reduction effects are maximized when the concentration of the carbon monoxide is high, when the upward velocity of the gas is slow, and when the thickness of the upper raw ore layer is thick. Thus the depth of the furnace should be determined by the necessary thickness of the molten layer and the raw material layer, and the length of the electrodes is consequently extremely longer than those hitherto employed in accordance with the prior art practice.

The direct reduction of the molten material is increased with increasing contact surface area between the molten ore and the reducing agent, e.g. coke or the like. The solid coke reducing agent and the molten ore can be forced into more intimate contact by the weight of the supervening layer of raw materials. The temperature of the molten material is established at a level such that the amounts of reducing agent, ore, slag-forming material and the like, are present in the molten material in balanced reaction proportions.

The relative thicknesses of the various layers of materials in the furnace can be readily established on the basis of their relative specific gravities.

The specific nature of the invention as well as many objects, uses and advantages thereof will clearly appear from the following description and from the accompanying drawings, in which.

Figure 1:
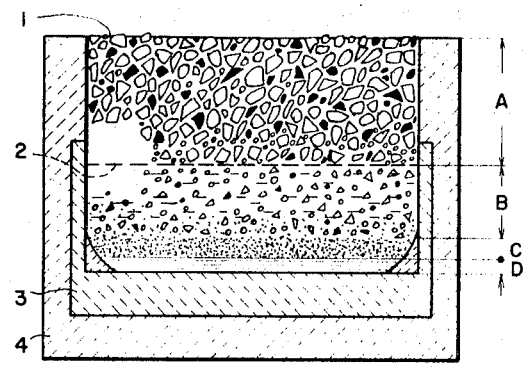
FIG. 1 is a vertical sectional view showing the inside of an electric furnace for smelting which can be operated by the method of the present invention.

Referring now to the drawings, FIG. 1 is a sectional view showing the interior of the furnace as explained in the foregoing; in which A designates a solid layer of compounded raw material, including raw ore, reducing agent, flux, and the like; B a layer of molten material and solid reducing material, C a molten slag layer, D a molten product metal layer, 1 the upper raw material surface, 2 the raw material, molten material interface, 3, and 4, furnace walls.

The compounded raw material is a mixture of ores, particulate reducing agent, such as coke or the like, and slag-making material (flux, usually limestone, dolomite, occasionally silica). A composite apparent specific gravity can be determined from the respective specific gravities, proportions and size grading distribution.

In the molten material in the layer B, the specific gravity is determined by the temperature and the composition and it is usually more than twice the specific gravity of the solid reducing material which is mixed with the molten material.

With use of the particulate coke reducing agent the reducing material in the compounded raw material is forced into the molten material by the mass of the compounded raw material in the upper layer, so that voids or pores in the particulate reducing material are filled by the molten material. And, since the specific gravity of the molten material is larger than that of the particulate reducing material, a buoyancy works on the reducing material, so that a balance between the thickness of the molten layer B, comprising the molten material and particulate reducing material, and the thickness of the compounded raw material layer A, can be maintained.

The main reaction is attained in the layer B in which the molten material and reducing material are contacted. That is, the molten material reacts at the surface of the reducing material, where the direct reduction takes place, and the metal particles are formed and separate to drop from the surface of the reducing material, and enter in the molten product layer D at the furnace bottom.

On the other hand, the CO gas moves upwardly into the solid raw material layer A, to contact and give heat to the solid material, and causes a gas reduction (indirect reduction) according to the temperature distribution, and continues to move upwardly changing the composition of the gas itself to $CO_2$ and eventually to be withdrawn from the surface 1 of the compounded raw material layer A.

The mass of the reducing material, in contact with the molten material is reduced and, with the advance of reaction, is replenished with the particulate reducing material from the upper layer A in the compounded material. On the other hand, the concentration of the specific component in the molten material is lowered by reduction. Ores in the compounded raw material at the upper layer A pass down into the molten material, changing into the low class oxide and melting into the molten matter. Thereby, the concentration of specific components is maintained approximately constant in response to the required temperature.

The amount of the molten material in the furnace increases in proportion to impurities gangue in the ores, slag-making material (flux), and ash in the particulate reducing material. A suitable tap may be taken to match the tap of the molten product metal out of the furnace. With care, the amount of the molten material accumulated in the furnace will not be varied greatly.

The relationship between the thickness of the compounded raw material layer A, and the thickness of the layer of solid reducing material dispersed in the molten material, layer B can be easily established on the basis of the specific gravities, area of the reaction furnace, and the temperature of operation.

If the reducing material decreases while the electrical power applied in the electric furnace is constant, the portion dispersed in the molten material from layer A of compounded raw material increases naturally, and with this the melting speed of the ore and the other materials increases and the temperature of the molten layer is reduced and, therefore, the direct reducing reaction will be slowed down and impeded.

In contrast to the above, if the reducing material is increased, the amount of the raw material layer A which dips into the molten material decreases due to the increase of the buoyancy of the solid reducing agent, thus the melting speed decreases and the temperature goes up. In this case, the reduction of impurity components such as the gangue increase or the heat loss is increased.

Under these circumstances as described above, the quantity of the particulate reducing material in the molten material is the important condition in the determination of the temperature in the furnace.

The amount of molten products maintained in the molten product layer D accumulated on the furnace bottom is preferably about equivalent to the amount of production per day. This is effective for reducing variation in quality and for protecting the lining of the furnace bottom.

The necessary amount of heat in the resistance furnace is supplied by electrical power, and power is supplied through the electrodes. Therefore, diameter of the electrodes, and their arrangement in the electrical furnace, etc., is determined by the size of the furnace to be used and the temperature condition necessary for the reducing reaction. A sufficient temperature should be selected so as to facilitate uniform distribution of heat.

In the prior art, at the time of product tapping, the entire amount of the molten material (slag-making material and molten product) are removed, so that, in the case of such an operating system, values employed as a size, voltage, current, etc., for the electric furnace are naturally different from those of the molten material retention system as explained above.

In general, the electric furnace operated by the method of the present invention, when compared to prior art operations, utilizes a higher voltage and a lower current density for a reactor of equivalent production capacity.

Figure 2:
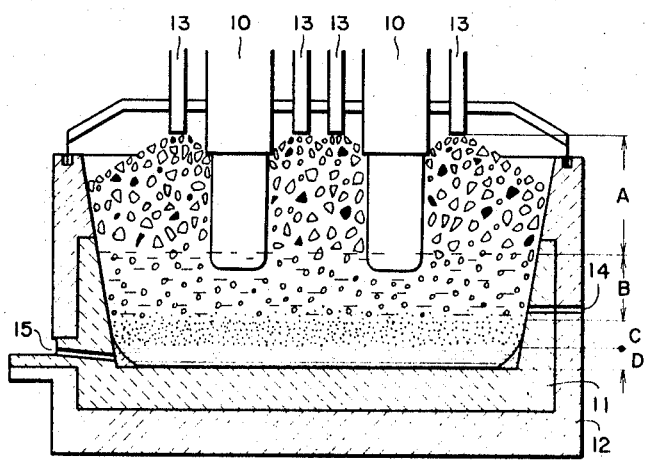
FIG. 2 is a vertical sectional view showing an interior construction of the smelting electric furnace of one embodiment in the present invention.
Figure 3:
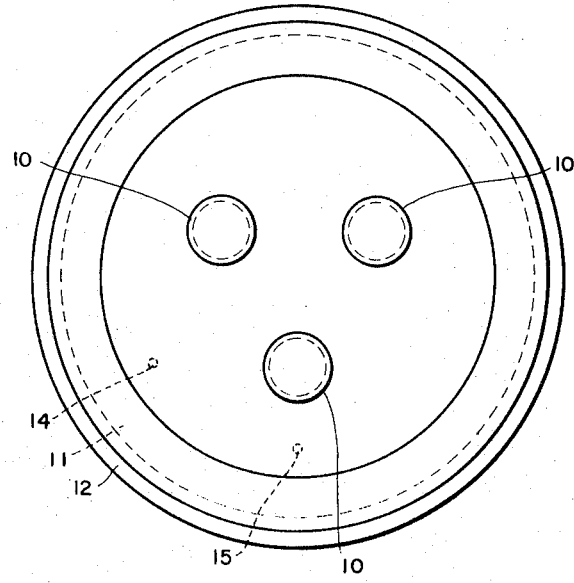
FIG. 3 is an explanatory view showing a plane arrangement of electrodes, slag tapping opening, and metal tapping opening, etc., provided in the furnace shown in FIG. 2.

One embodiment of an electric furnace of the present invention is shown in FIGS. 2 and 3, in which A designates a solid compounded raw material layer, B a layer of particulate reducing material and molten matter, C a molten layer, D a product metal layer, 10 electrodes, 11 and 12 walls of an electrical furnace, 13 feeding pipes for raw material, 14 a slag tapping opening, and 15 a metal tapping opening.

In the electric furnace according to the system of the invention, as shown in FIG. 2, it is necessary for the lower ends of electrodes 10 to always penetrate into the molten material layer B containing the solid reducing material, and the flow of electricity from the electrodes to the bottom of the furnace, which serves as a ground, passes through the molten material and that in the state of melting, and not directly pass from the electrodes through the raw material layer A. The current is applied across the resistance of the particulate reducing material, the voids of which are filled with the molten material, and the smelting furnace as a resistor is effective in operation.

Due to the higher heat conductivity of particulate reducing material and by maintaining the fluidity of the molten material, it is possible to attain extremely better uniformity of temperature distribution in the furnace.

According to the accompanying drawing, a three phase furnace having three electrodes is shown as an example. But as the capacity of the electric furnace is increased, it is possible to design the furnace with an expanded furnace bed area providing electrodes in multiples of two or three. Even in that case, it is needless to say that the section construction of the furnace must correspond to the teachings of the present invention.

I claim:

1. A method of smelting ores in a resistance furnace comprising, adding sufficient amounts of compounded raw material to form from the bottom to the top of the furnace a layer of molten metal; a layer of molten slag; a layer of molten material; and a layer of compounded raw material; inserting and maintaining electrode ends in the layer of molten material, supplying electrical power to the electrodes whereby the electric current passes through the resistance of said molten material to the grounded furnace walls to generate heat, and removing from time to time a portion of the molten metal and molten slag so that the layers in the furnace are not substantially changed in size.

2. The method of claim 1 further comprising adding sufficient amounts of compounded raw material to said furnace to over come the specific gravity of the layer of molten material whereby the reducing material in the compounded raw material will descend into the layer of molten material.

3. The method of claim 2 further comprising reducing the ore particles in the compounded raw material at the interface between the upper two layers in the furnace with release of furnace gas therefrom, and using the heat of said gas to heat the ore particles and cause a partial reduction of said ore particles.